Oct. 18, 1927.
W. E. BOCK
1,645,684
METHOD AND APPARATUS FOR MANUFACTURING GLASSWARE
Filed June 11, 1923 13 Sheets-Sheet 4
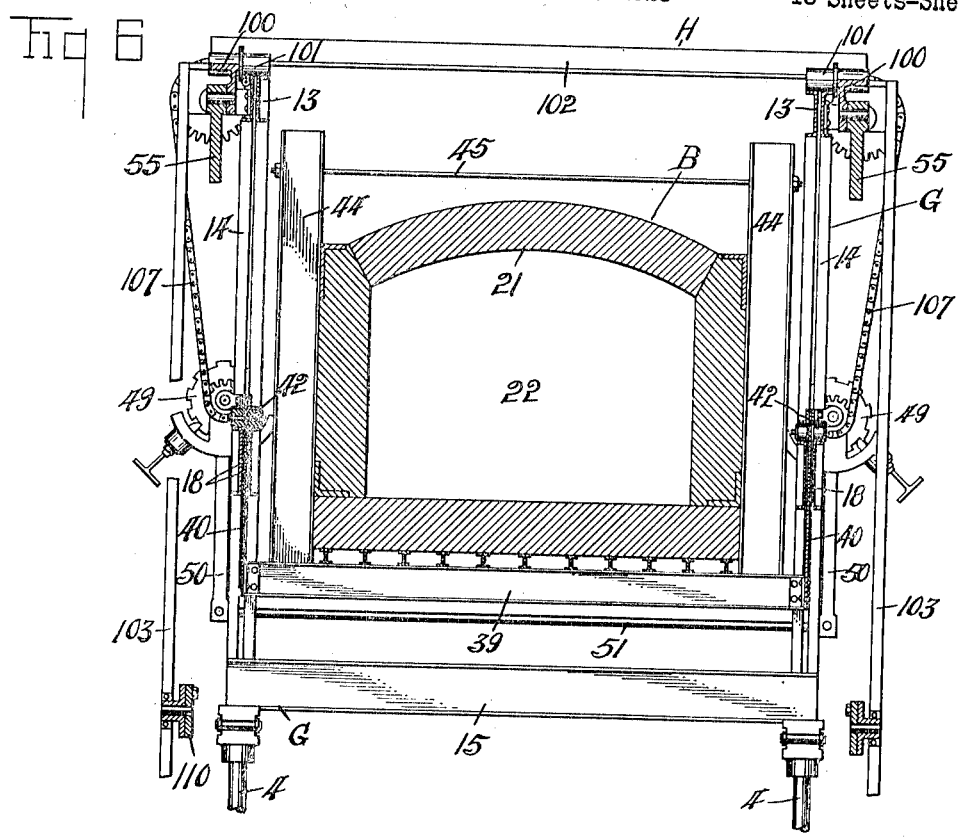
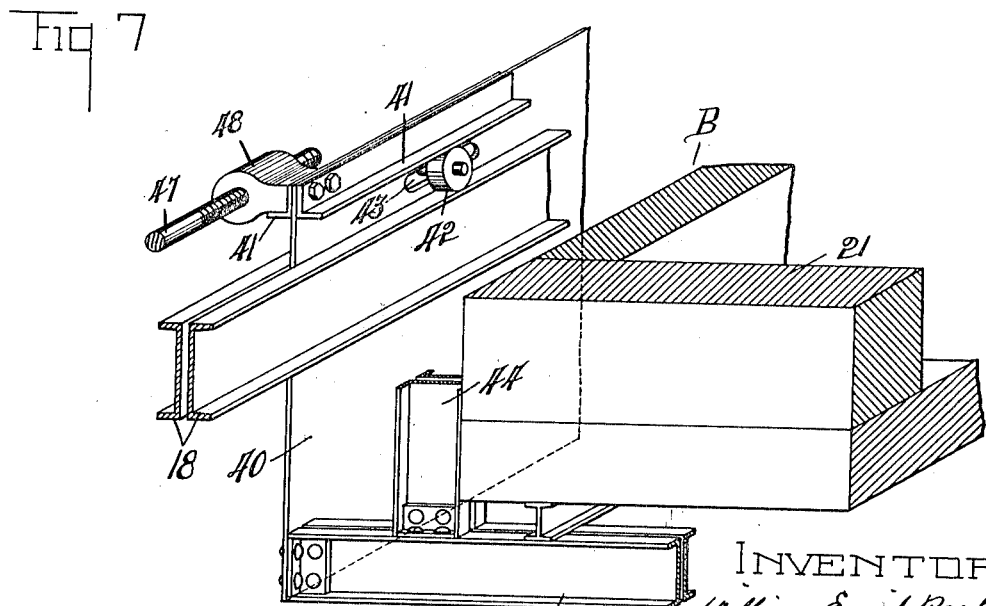
INVENTOR.
William Emil Bock,
By Owen Owen & Crampton
attys.

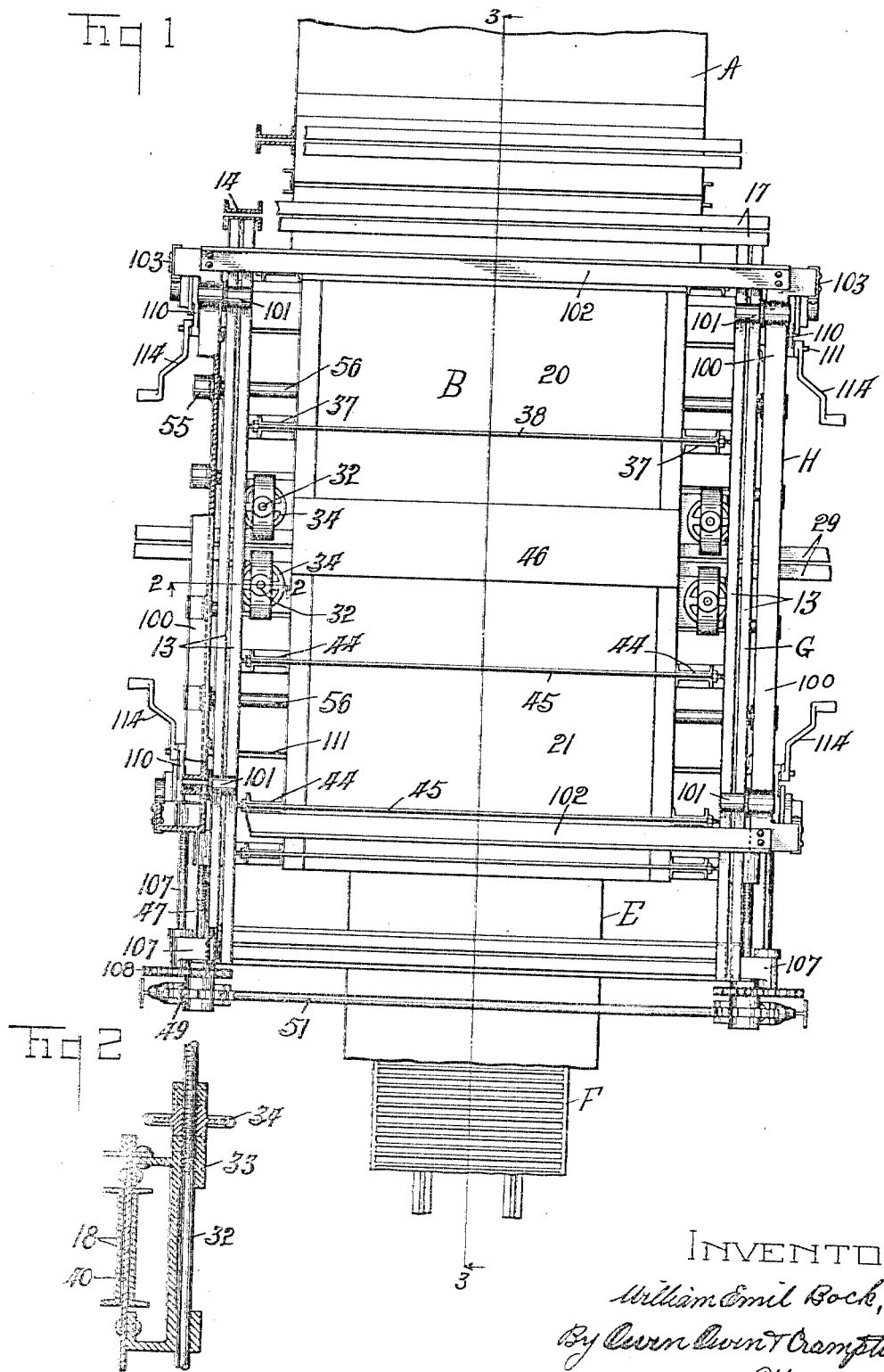

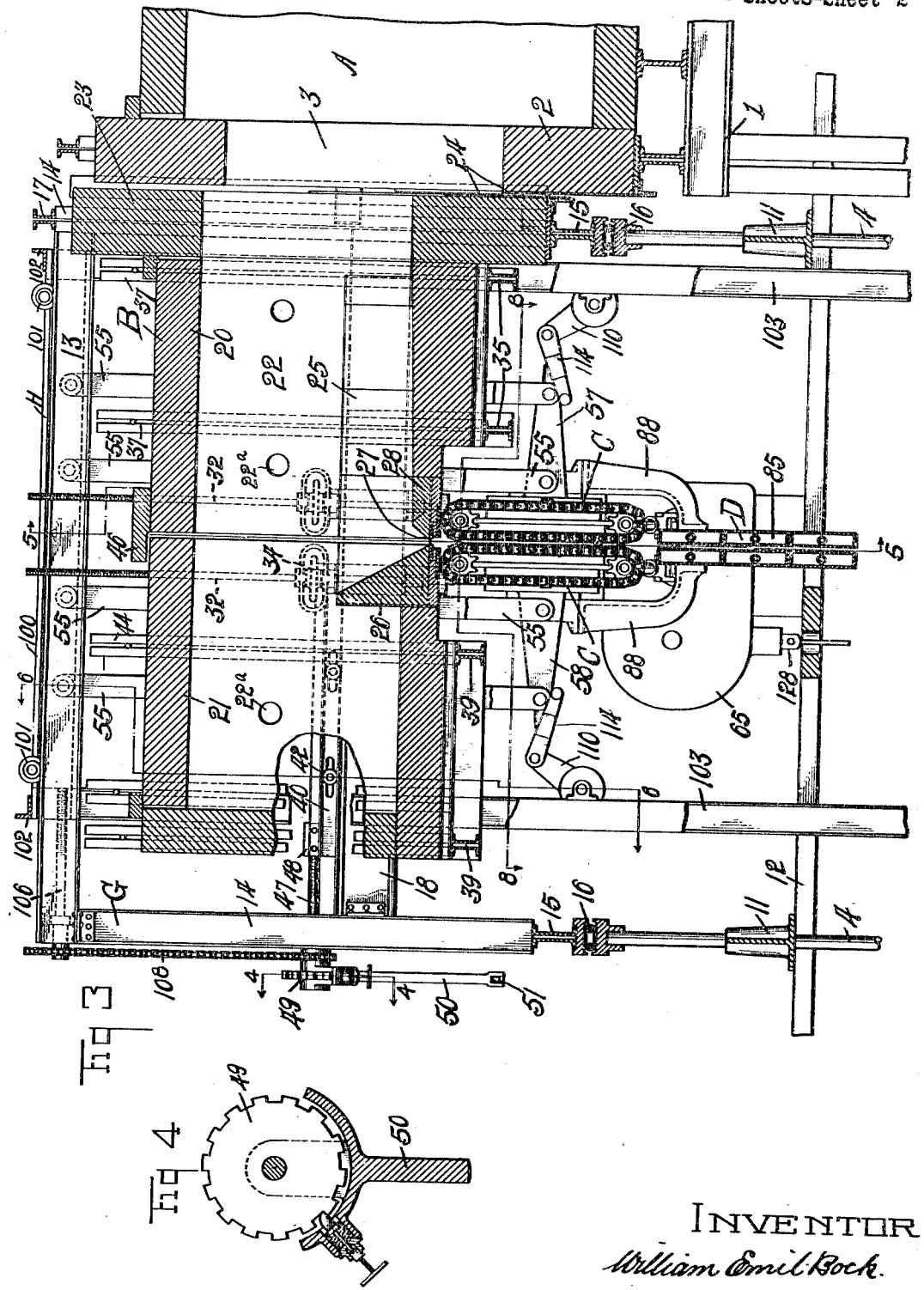

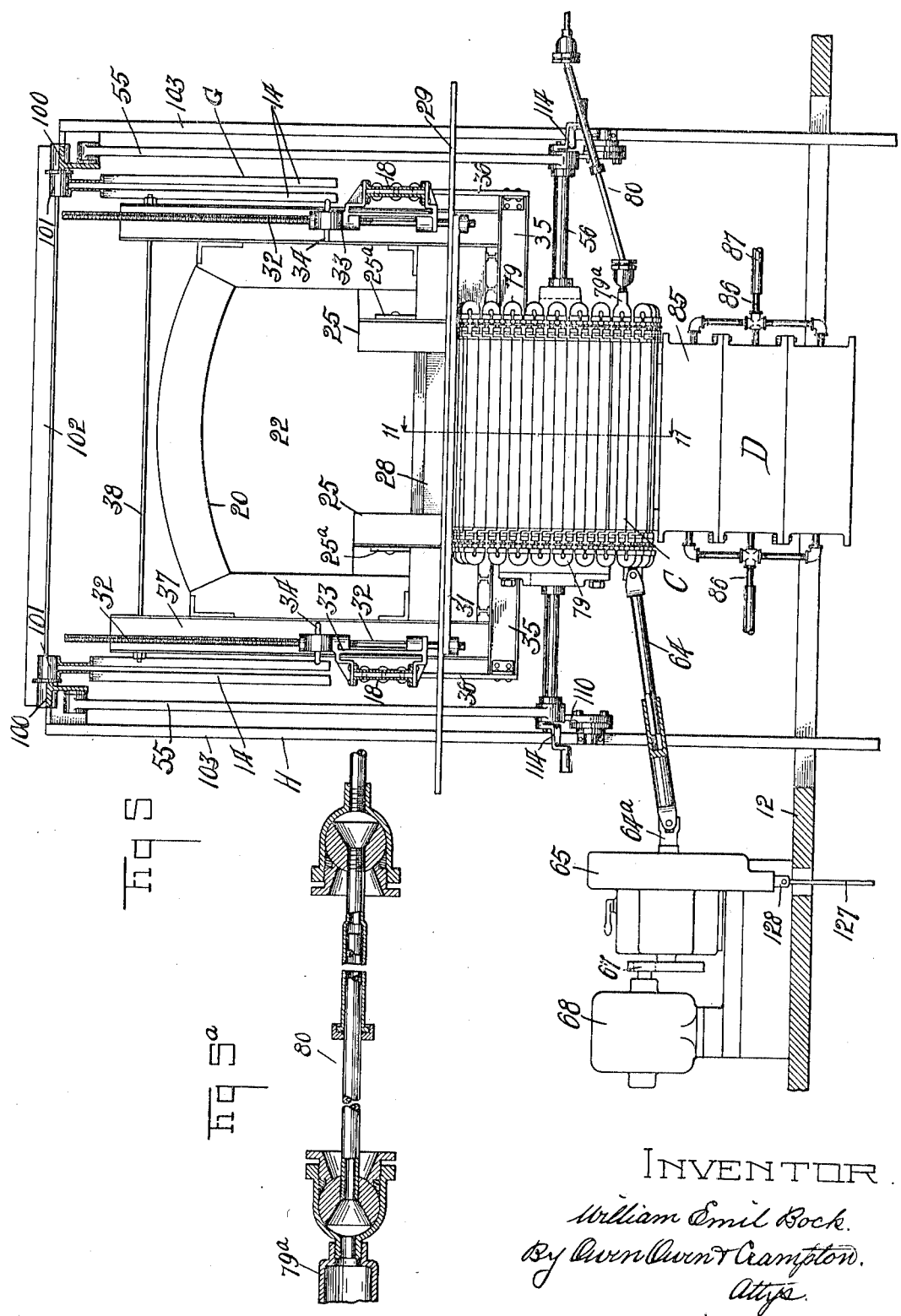

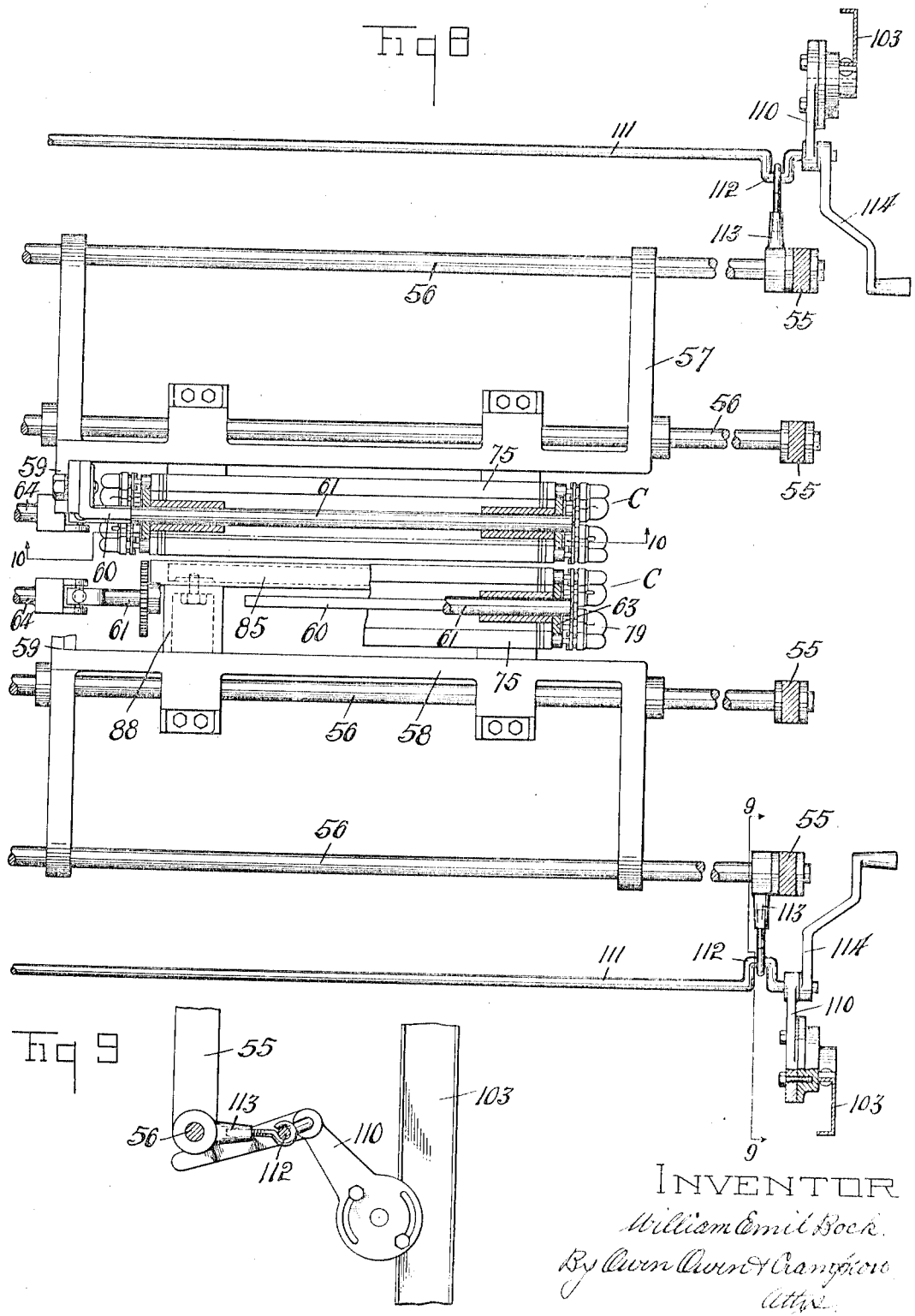

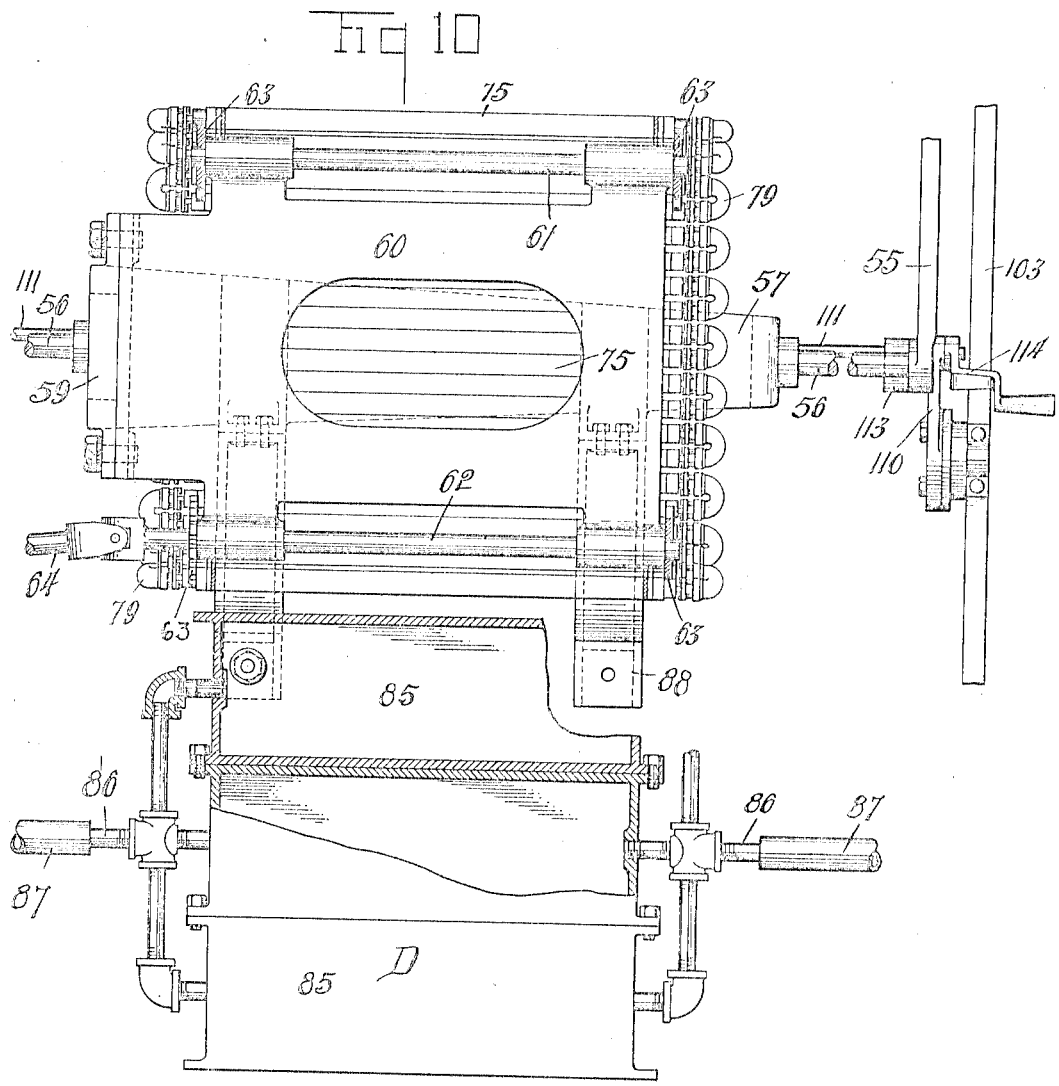

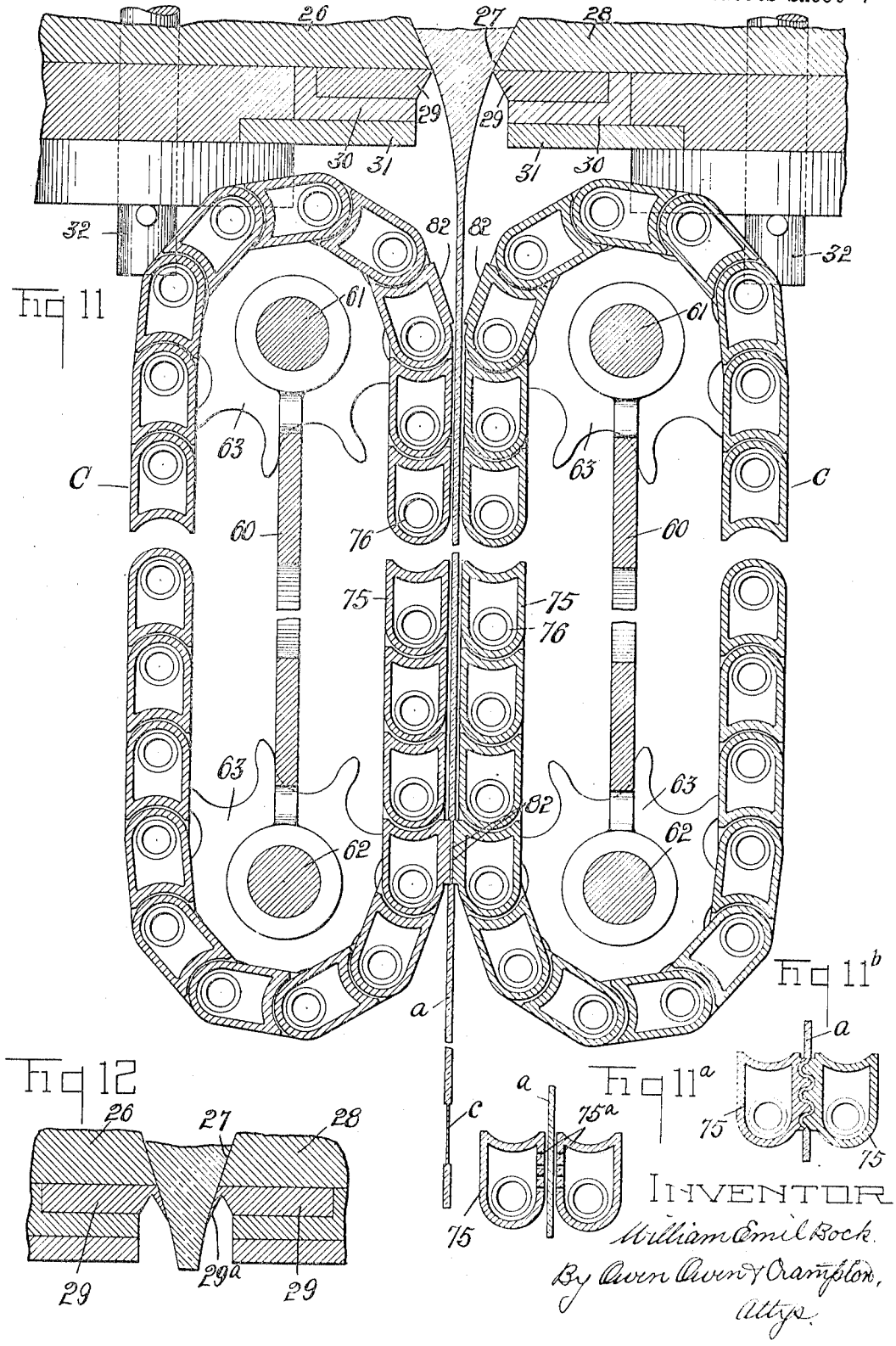

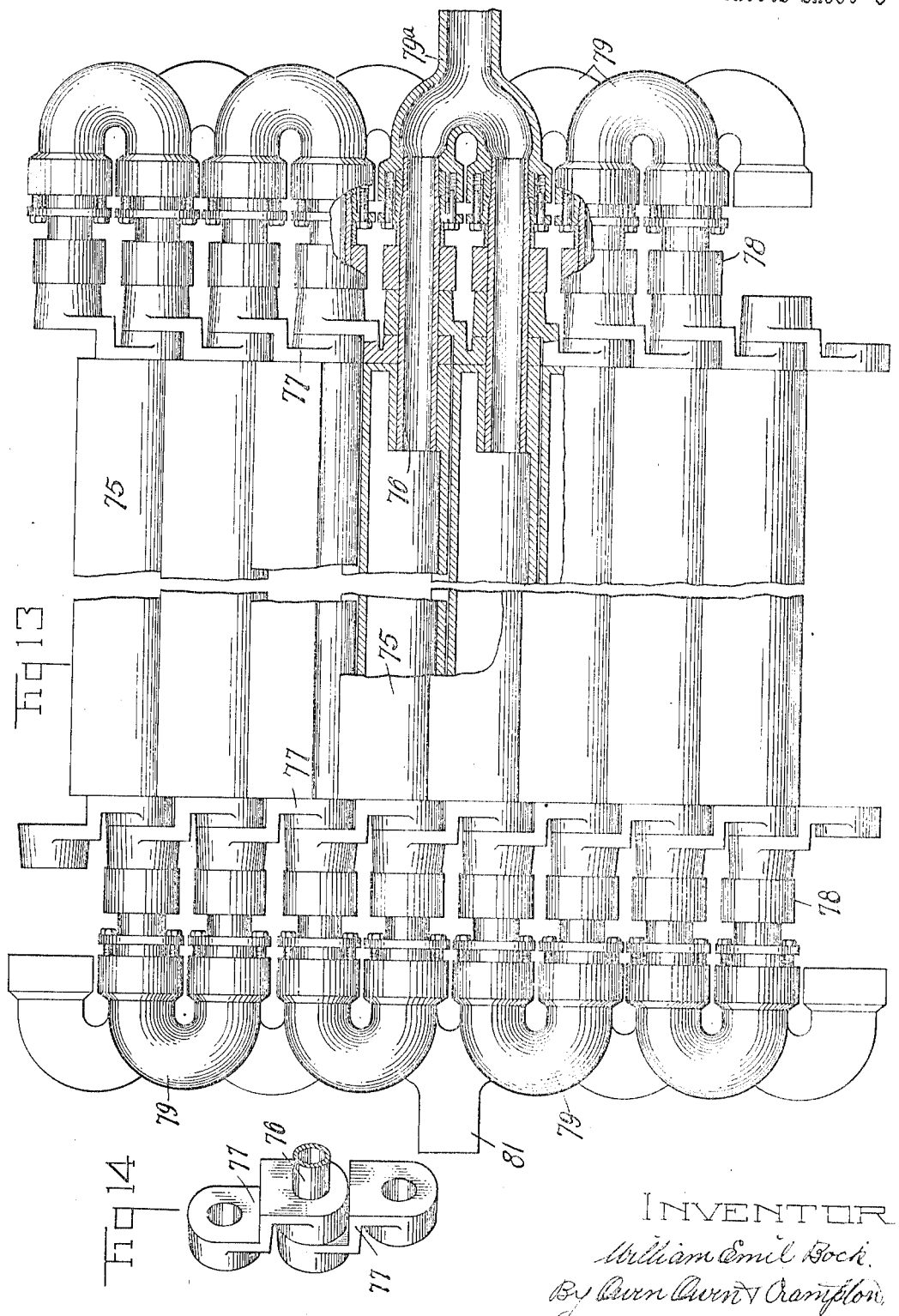

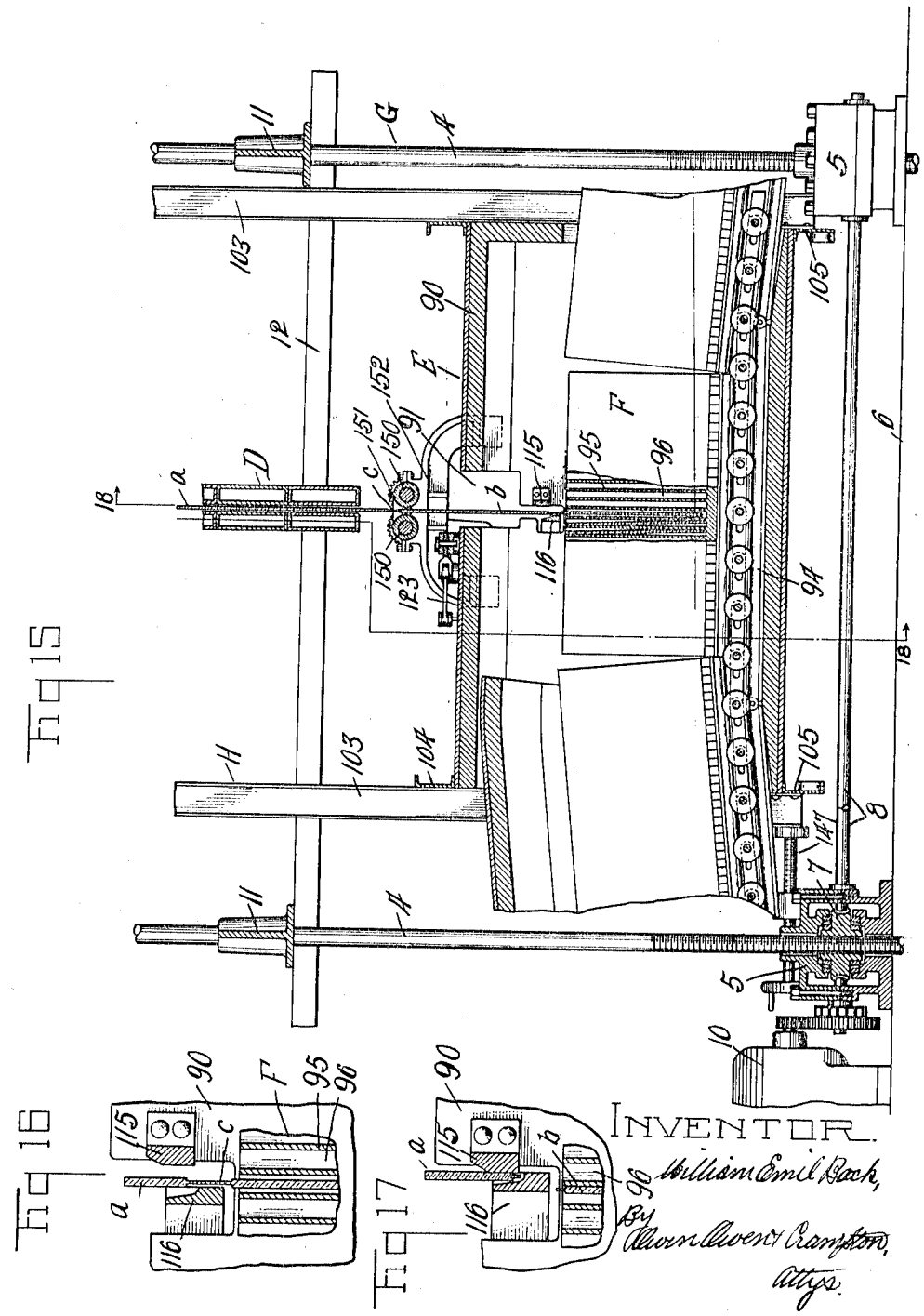

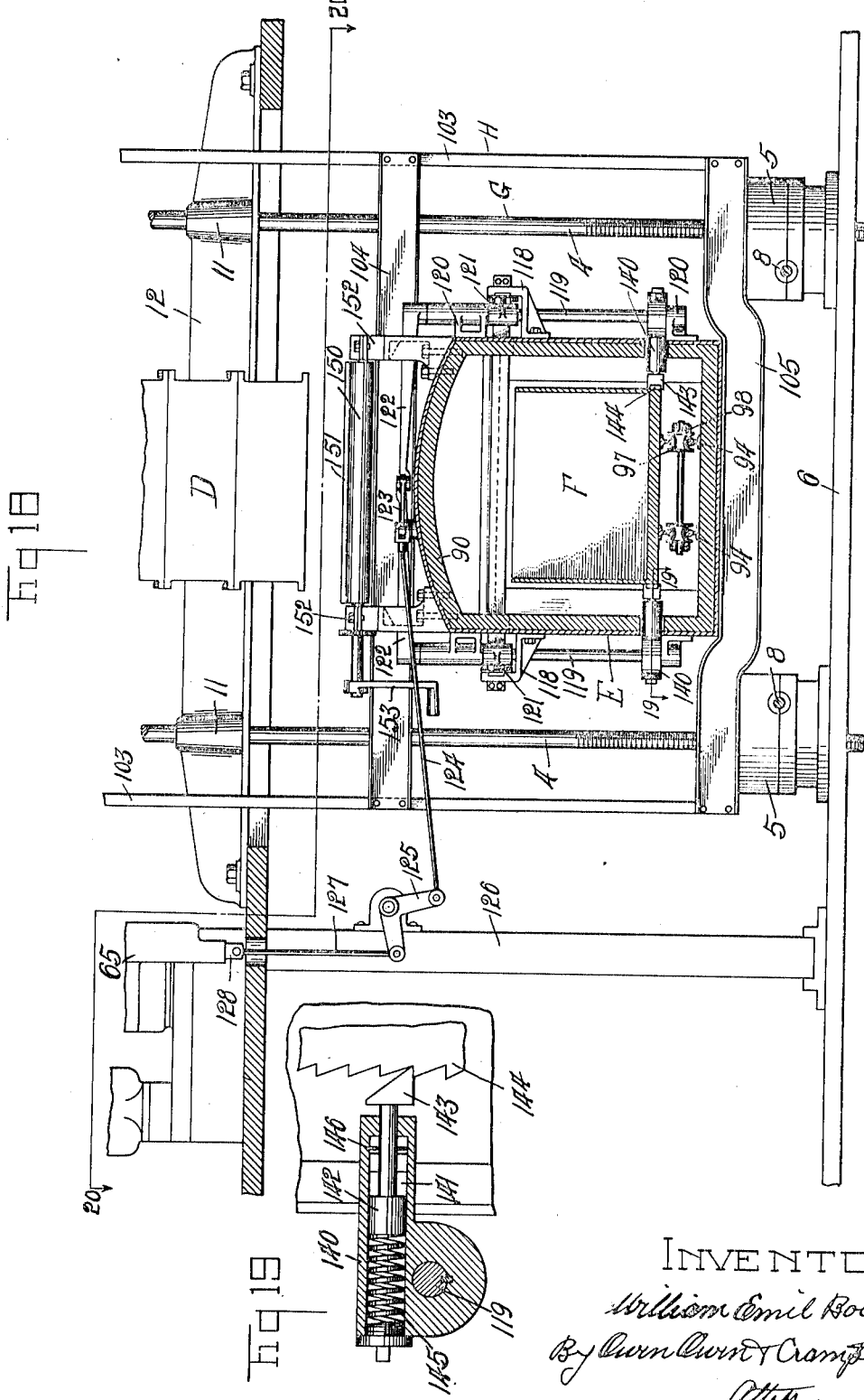

Oct. 18, 1927.
W. E. BOCK
1,645,684
METHOD AND APPARATUS FOR MANUFACTURING GLASSWARE
Filed June 11, 1923      13 Sheets-Sheet 11
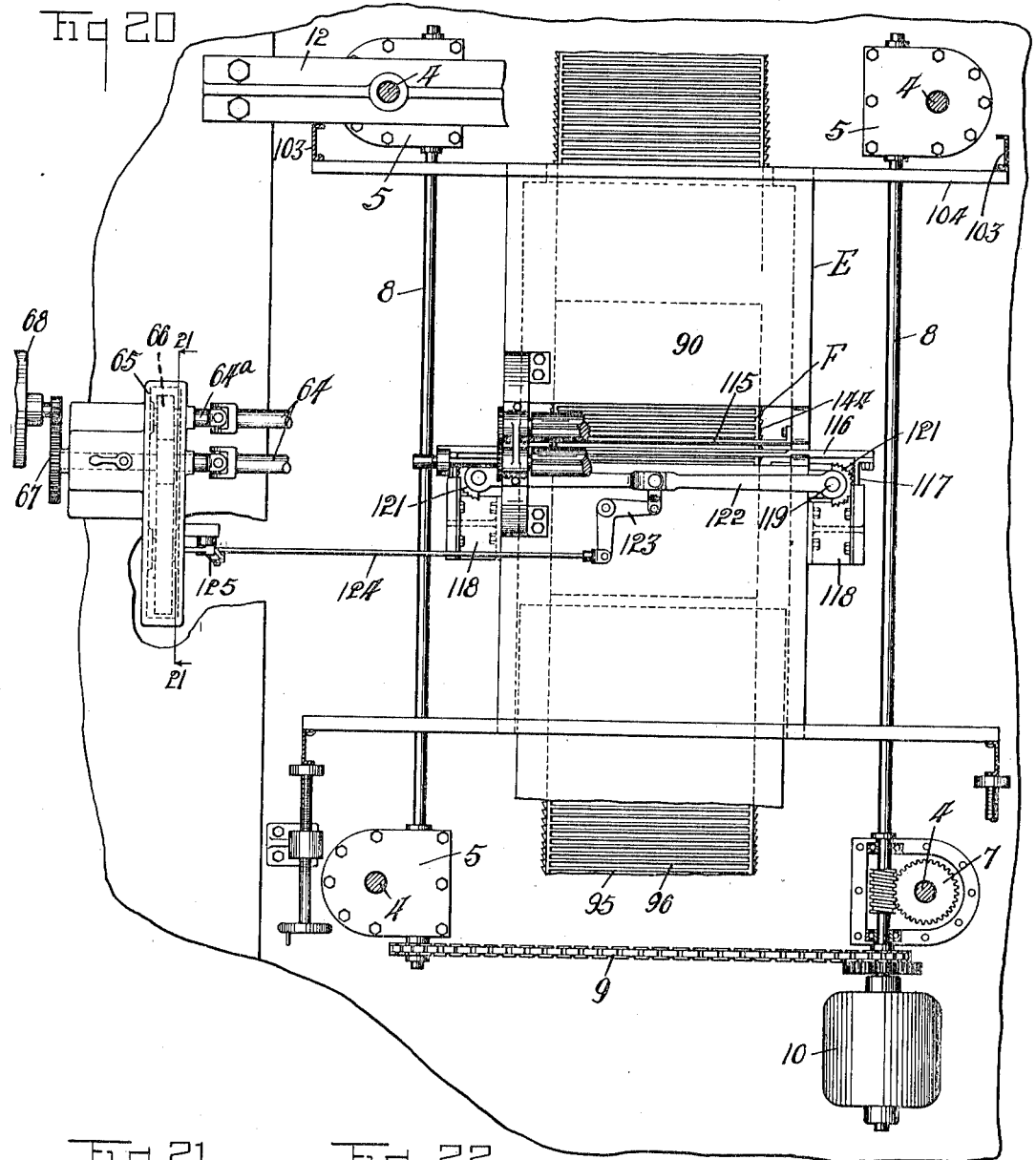
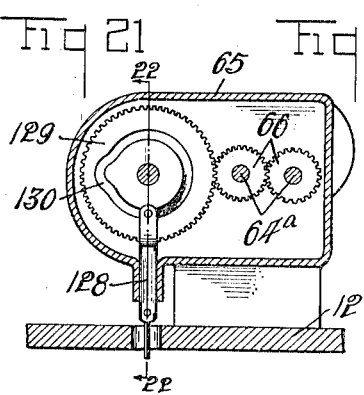
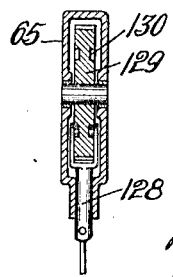

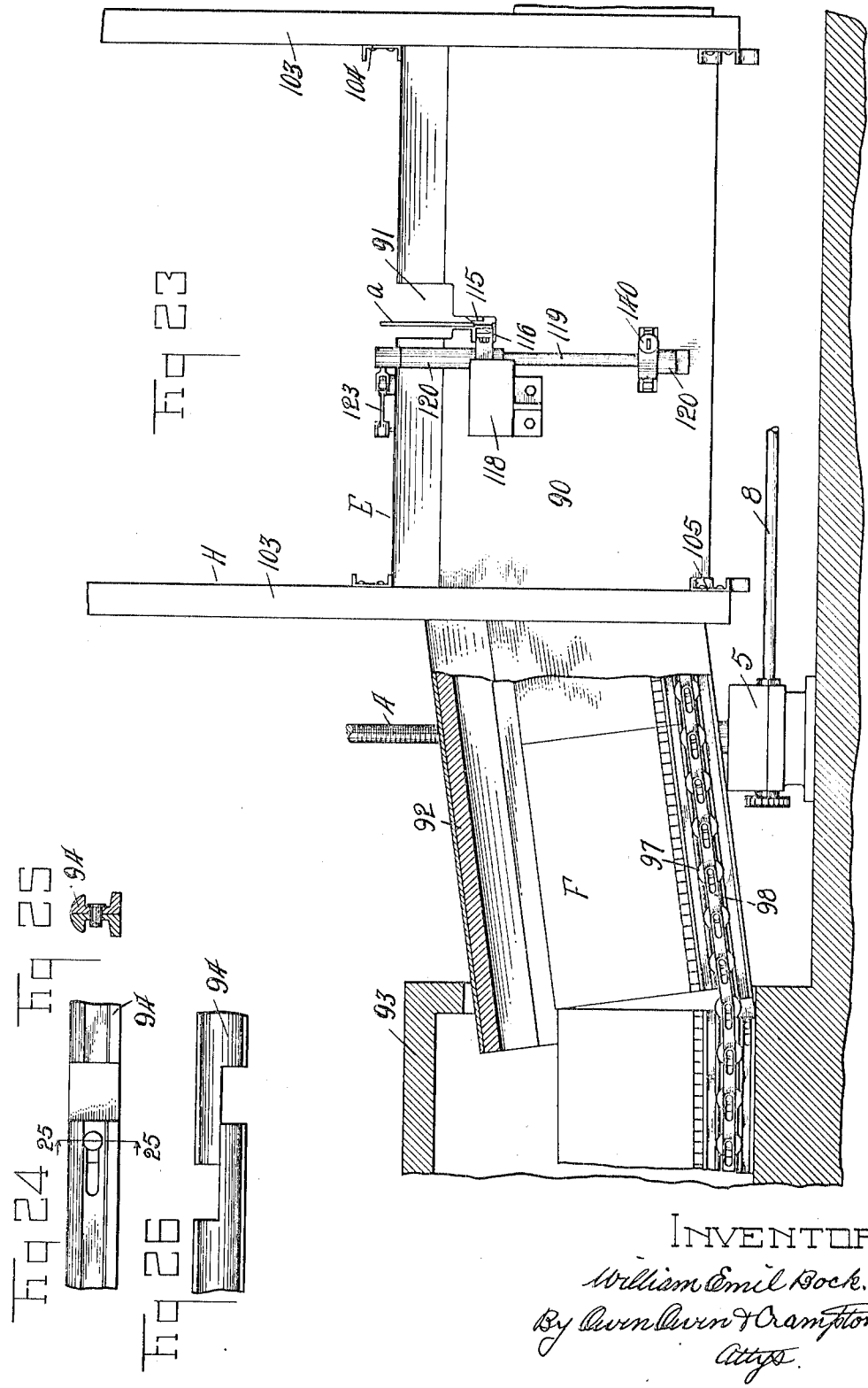

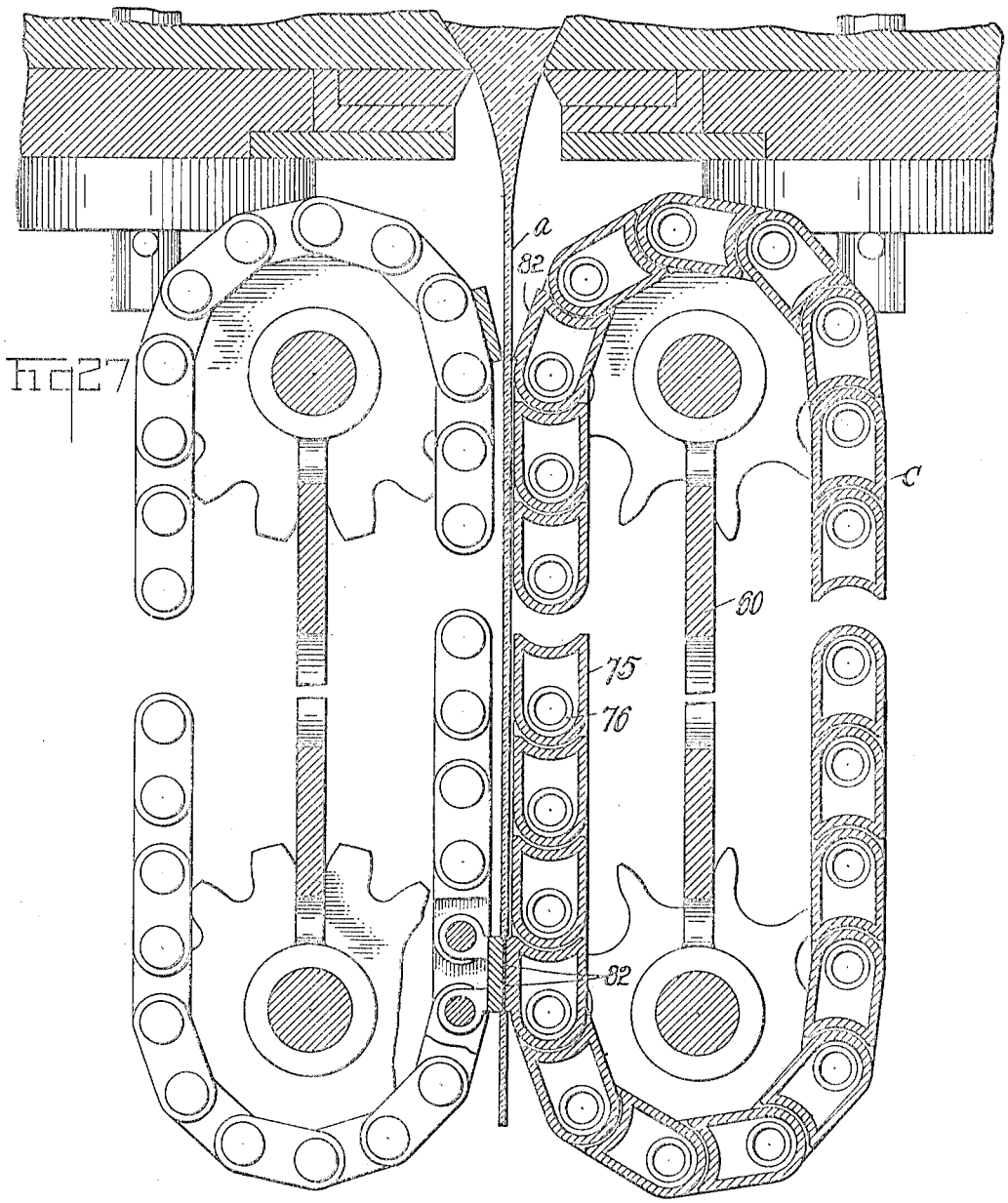

Patented Oct. 18, 1927.

1,645,684

UNITED STATES PATENT OFFICE.

WILLIAM EMIL BOCK, OF EAGLE POINT COLONY, OHIO, ASSIGNOR TO THE ERIE GLASS COMPANY, OF TOLEDO, OHIO, A CORPORATION OF DELAWARE.

METHOD AND APPARATUS FOR MANUFACTURING GLASSWARE.

Application filed June 11, 1923. Serial No. 644,562.

This invention relates to the manufacture of glassware and particularly to the continuous formation of sheet glass.

The general object of the invention is the production of sheet glass in a rapid, efficient and economical manner without creating strains, shrouding or surface lines in the sheet and without marring the sheet surfaces intermediate longitudinally spaced gripping points thereof, and subsequently severing the sheet sections along or adjacent to the points of gripping of the same by the feeding means, the sheet sections being deposited in or onto a carrying means passing through a leer.

A specific object of the invention is the provision of moving cooling aprons or blankets at opposite sides of the sheet adjacent to its formative point and which are disposed at and continue in close proximity to the sheet surfaces without contacting the same for prolonged portions of their movements and effect a cooling of the sheet by radiation through intervening spaces.

A further object of the invention is the provision of integral cross-bar portions by whatsoever means at predetermined spaced intervals longitudinally of the sheet while in a formative condition, which cross-bars prevent any material or detrimental shrouding and narrowing in of the soft portions of the sheet intermediate the bars.

A further specific object of the invention is the provision of simple and efficient means for intermittently gripping the sheet adjacent to its formative point and effecting a rapid cooling of the gripped portions to form the sheet with integral hardened cross-bar portions at the points of gripping, which portions after a release of the sheet by the gripping bars, serve to prevent narrowing in and shrouding before the sheet becomes set.

A further specific object of the invention is to so grip or engage the sheet by the feeding or feed controlling means therefor that there is, except momentarily, only one point of gripping of the sheet by such means between the source of glass supply or formative point of the sheet and the point of leaving the means, thereby permitting sufficient stretching of the sheet to prevent wrinkling and shrouding, which might occur between two rigidly gripped portions of the sheet due to the soft glass therebetween flowing down by gravity action faster than the permissible feeding movement of the sheet.

A further specific object of the invention is the provision of the discharge slot for the glass sheet in the bottom of a furnace forehearth and rendering the portion of the forehearth without the slot adjustable relative to the other portion thereof to vary the width of the discharge slot as desired.

A further specific object of the invention is the provision, in combination with a vertically adjustable forehearth from which a stream of ware forming glass flows, of a subjacent leer section into which the stream passes, which section is vertically adjustable to correspond to any vertical adjustment of the forehearth so as to maintain the distance between the same substantially constant, the forehearth and leer section preferably being connected together for adjustment in unison.

Further objects and advantages of the invention will be apparent from the following detailed description thereof.

While the invention, in its broader aspect, is capable of embodiment in numerous forms, a preferred embodiment thereof is illustrated in the accompanying drawings, in which,—

Figure 1 is a top plan view of an apparatus embodying the invention, with parts fragmentarily shown. Fig. 2 is an enlarged section on the line 2—2 in Fig. 1. Fig. 3 is a central vertical section on the line 3—3 in Fig. 1, with parts broken away and parts shown in full. Fig. 4 is an enlarged section on the line 4—4 in Fig. 3. Fig. 5 is a vertical cross-section on the line 5—5 in Fig. 3. Fig. 5ª is a detail partly in longitudinal section of the flexible cooling fluid connection for the aprons. Fig. 6 is a vertical cross-section on the line 6—6 in Fig. 3. Fig. 7 is an enlarged fragmentary perspective view of a front corner portion of the forehearth and of the supporting means therefor. Fig. 8 is an enlarged fragmentary section on the line 8—8 in Fig. 3, with parts broken away. Fig. 9 is an enlarged section on the line 9—9 in Fig. 8. Fig. 10 is a vertical section on the line 10—10 in Fig. 8, through one of the cooling and feeding units, with parts broken away and parts in full. Fig. 11 is an enlarged section on the line 11—11 in Fig. 5, with parts broken away. Fig. 11ª is a cross-section of a slightly modified form of two bars of the cooling apron. Fig. 11$^b$ is a cross-section of a slightly modified form of the sheet gripping bars. Fig. 12 is an enlarged fragmentary cross-section of a modified form of the discharge slot forming portion of the forehearth. Fig. 13 is an enlarged face view of a number of links forming the cooling aprons in assembled relation and with parts broken away. Fig. 14 is a perspective view of two of the chain links of the cooling aprons with such links in connecting relation. Fig. 15 is a vertical longitudinal section of the lower portion of the apparatus embodying a portion of the leer, with parts broken away, such section being taken on the line 3—3 in Fig. 1 and forming a continuation of the section shown in Fig. 3. Figs. 16 and 17 are enlarged fragmentary details of the severing means for the sheet section, with the former in normal and the latter in severing position. Fig. 18 is a section on the line 18—18 in Fig. 15. Fig. 19 is an enlarged fragmentary section on the line 19—19 in Fig. 18, with parts in full. Fig. 20 is a fragmentary section on the line 20—20 in Fig. 18, with parts broken away. Fig. 21 is a section on the line 21—21 in Fig. 20. Fig. 22 is a section on the line 22—22 in Fig. 21. Fig. 23 is a fragmentary side elevation partly in section of the leer. Fig. 24 is a side elevation of the jointed ends of two track rails of the leer. Fig. 25 is a cross-section thereof. Fig. 26 is a top view thereof, and Fig. 27 is a view similar to Fig. 11 with an open sheet gripping member at one side.

Referring to the drawings, A designates a glass melting furnace, refining tank or other suitable source of molten glass supply which, for convenience, may hereinafter be referred to as a furnace, and B a forehearth into which the glass passes from the furnace and then flows downward in a stream $a$, in the present instance, of sheet form, through a bottom slot or elongated discharge opening in the forehearth bottom. The sheet $a$ passes down between a pair of opposed cooling aprons or blankets C, C, the blankets moving with and being spaced from the sheet, except at predetermined spaced gripping points, so that the blankets in addition to serving as cooling means for the sheet also act to control the downward feeding movements thereof. The sheet $a$ after passing from between the cooling aprons is further cooled or has its temperature controlled by passing between opposed stationary temperature controlling parts D, D and then enters a subjacent leer E, being successively severed into separate sections $b$ as it enters the leer, which sections are deposited in trucks or carriers F that have a slow feeding movement through the leer.

The furnace A is mounted in any suitable manner on a stationary framework or support 1 and is provided in its front end wall 2 with an opening 3 through which the molten glass passes into the forehearth B.

A vertically adjustable frame G, Figs. 1, 3, 5, 6, 15, 18 and 20, is mounted in front of the furnace A in substantially enclosing relation to the forehearth B and has its lower portion disposed in position for the leer E to extend transversely through or below the same. This frame includes the four upright posts 4 arranged in rectangular relation and each extending down through a box 5 mounted on a floor 6 or other stationary support and enclosing a worm-wheel 7 through the hub of which the post is threaded. It is thus evident that a turning of each worm wheel will effect a raising or lowering of the associated post 4, depending on the direction of turning of the wheel. The worm wheels 7 are geared to respective shafts 8, which connect the boxes 5 in pairs and which are connected together by a chain and sprocket wheel connection 9 (Fig. 20), and one shaft is in geared connection with a motor 10 thereby enabling the shafts to be driven in unison from the motor, to effect a simultaneous raising or lowering of the posts 4. The posts 4 pass through respective guides 11 provided in a stationary framework 12 disposed above the point of passage of the leer through the frame G.

The upper portion of the frame G rests on the posts 4 for limited horizontal movements relative thereto toward and away from the front end of the furnace A to allow for contraction and expansion under varying heat conditions. This portion of the frame G comprises a pair of transversely spaced longitudinally extending beams 13 supported at their ends by front and rear corner upright posts 14, which in turn are mounted at their lower ends on respective front and rear cross beams 15, which are supported by and have movable bearings 16 on the upper ends of the respective front and rear posts 4. The rear uprights 14 are transversely tied together by a top cross beam 17. A beam 18 connects the front and rear uprights 14 of each side pair of uprights of the frame G at a distance below the top beams 13, and each beam 18 preferably is of double channel bar construction with the web portions of the bars disposed in facing relation and slightly spaced apart, as best shown in Fig. 7 for the purpose hereinafter described.

The forehearth B is supported from the frame G within the upper portion thereof for vertical adjusting movements therewith by a cradle structure, as hereinafter described, and in the present instance, comprises two longitudinally aligned separable sections 20 and 21 adapted to abut at their inner ends and forming an elongated chamber 22 which is preferably closed at its top, bottom, sides and outer end except for the provision of a glass discharge slot in the bottom thereof, and has its inner end open to register with and permit glass to flow therein from the furnace opening 3. Burner receiving openings 22ª are provided in the walls of said chamber. The inner end of the forehearth is preferably provided with an enlarged head-piece 23 which has sliding coaction with the outer side of the furnace end 2. It is preferable to face the meeting surfaces of the parts 2 and 23 with plates 24 of nichrome or other suitable high heat resisting material, or at least the lower portions thereof with which the glass may come in contact. The glass which enters the forehearth chamber 22 does not cover the entire bottom of the chamber but is confined within a trough-like portion thereof formed by side walls 25 and an outer end wall 26 rising from the chamber bottom in spaced relation to the side and end wall thereof, thereby protecting the glass from the cooling action which would result if it had contact with the outer side walls of the chamber. Said directing trough is open at its inner end to the furnace opening 3 and its bottom is preferably slightly tapered downward and outward to the bottom discharge slot 27, which is disposed transversely of the forehearth and in the line of separation of the sections 20 and 21 thereof. The end wall 26 of the glass directing trough is carried at the inner end of the forehearth part 21 and forms a lip-tile or block, the inner side of which is tapered downward and inward to the discharge slot and cooperates with an opposed correspondingly tapered lip-tile or block 28 at the forward lower bottom edge of the forehearth section 20 to form the discharge slot 27. The lip-tiles 26 and 28 have end flanges forming parts of the trough walls 25. Plates 25ª are secured to the forward ends of the walls 25 at their outer sides and lap the ends of the block 26 to prevent leakage of glass therebetween when the forehearth section 21 is adjusted to widen the slot 27. The lower adjacent edges of the lip-tile 26 and 28 are preferably provided with lip-plates 29 of nichrome or other suitable heat resisting material, which are removably held to the respective lip-tile by bottom plates 30 and 31 extending lengthwise thereof. The plates 31 extend beyond the sides of the forehearth B and are suspendingly attached at their ends to upwardly extending adjusting rods 32 (Fig. 5), which extend up through respective guide brackets 33, mounted on the adjacent side beams 18, and thread through hand operated adjusting wheels 34 in said brackets.

It is thus evident that the lip-tile 26 and 28 and respective bottom plates 29, 30 and 31 may be lowered from the forehearth, to facilitate repair or replacement of the parts thereof, by a turning of the hand wheels 34. It is preferable to employ the lip plates 29 as resistance heaters in an electric circuit 70 to heat the contacting surface portions of the glass stream the desired extent as it flows from the discharge orifice. Nothing novel is claimed for this feature, however, in the present application. In Fig. 12 the lip-plates 29 are provided at their outer edges with downwardly extending lip edges 29ª which contact throughout their lengths with the glass and terminate in sharp edges, thereby preventing any tendency of the glass to follow down the outwardly inclined end surfaces of the lip-plates.

The inner section 20 of the forehearth B is carried by U-shaped cradle members comprising the cross-beams 35, which extend under the bottom of the section, and the uprights 36, which extend up at the outer sides of the section and between the side beams 18 of the frame G to which beams they are fixedly secured by rivets, or in any other suitable manner, as shown in Fig. 5. The head block 23 of the inner section 20 rests on the rear cross-beam 15 of the frame G. A buck-stay 37 rises from the outer end of each cross-beam 35 in engagement with the outer respective sides of the forehearth section 20 and these stays are connected in pairs crosswise of the forehearth by stay bolts 38.

The outer adjustable forehearth section 21 has a movable cradle support comprising two cross-beams 39 extending under the section, and side plates or members 40 rigidly connect the adjacent ends of the beams 39 and rise therefrom loosely through the spaces between the members of the side beams 18, as best shown in Figs. 3, 6 and 7. The plates 40 above the beams 18 are provided with longitudinally extending oppositely projecting side flanges 41 between which and the upper edges of the respective beams 18 are disposed rollers or anti-friction means 42, which permit free movements of the cradle longitudinally of the supporting beams 18. The spindles carrying the rollers 42 in pairs project through slots 43 in the plates 40. Buck-stays 44 rise from the cross-beams 39 at the sides of the forehearth section 21 and are connected in pairs at their upper ends above the section by tie-rods 45. It is evident that the cradle 39, 40 may be moved backward and forward on the beams 18 of the frame G and carry the forehearth section 21 therewith to effect an adjustment of the width of the glass discharge slot 27. The seam or space between the adjacent ends of the top walls of the forehearth sections may be covered by lapping members 46 if desired. (Figs. 1 and 3.)

An adjustment of the cradle 39, 40 is effected by a turning of screws 47, which are journaled in bearings on the front upright members 14 of the frame G and have their inner ends threaded into bosses 48 on the respective cradle plates 40. Each screw shaft 47 has a right and left ratchet means mounted on its inner end, the wheel 49 of which is fixed to the shaft, while the lever member 50 thereof is swingingly mounted on the shaft, as best shown in Figs. 3 and 4. A spring pressed pawl member is carried by the lever and may be adjusted to have right or left actuating engagement with the wheel. The levers 50 of the two screw actuating mechanisms are connected together by a rod 51 to cause an operating of the two screws in unison when either is turned.

The construction and manner of mounting the cooling and feed control aprons C will now be described. A plurality of bars 55, in the present instance four in number, are pivotally suspended from each top beam 100 of the frame H, hereinafter described, down at the respective sides of the forehearth and below the same, and each is pivotally connected at its lower end to the adjacent end of a respective cross-shaft 56, as shown in Figs. 3 and 8. The two rear shafts 56 carry a frame yoke 57, and the two front shafts 56 carry a frame yoke 58. Each of these yokes, in the present instance, is of reclining U form, and each has an arm 59 projecting inwardly therefrom. A vertically disposed web-like frame 60, Fig. 10, projects from each arm 59 in parallel relation between the yokes 57 and 58 in spaced relation thereto and to each other, and each has upper and lower shafts 61 and 62 journaled therein transversely of the forehearth and in parallel relation. Each shaft has a sprocket wheel 63 on each end, and these wheels guide the movements of each apron C, which extends around the respective frame member 60. The lower shaft 62 of each set, in the present instance, is connected through a flexible joint with a respective drive shaft 64, which is in flexible driven connection at its other end with any suitable source of power. In the present instance the shafts 64 have end sections 64ª journaled in a gear case 65 and connected therein by pinions 66 to turn in unison at the same speed. One shaft section 64ª is in driven connection through a set of gears 67 with a motor 68. The shaft 64 is shown as having longitudinally adjustable sections to permit it to accommodate itself to any adjustment of the aprons. The yokes 57 and 58 and frame parts and aprons C carried thereby are adjustable inward and outward with respect to each other, as hereinafter described, to effect a widening or narrowing of the space between the aprons. The purpose of mounting the aprons C in the manner described is to leave the side edges of the aprons at the outer ends of the frame members 60 entirely exposed so that connections for a cooling fluid may be attached to such edges and follow the courses of movement of the aprons, as hereinafter described.

The body portions of the aprons C, or the portions thereof between which the sheet a is moved are each composed of a plurality of closely jointed hollow pads 75, which are convex at one edge and concave at the other to adapt the successive pads to be disposed in close interengaging relation for relative pivotal movements in the manner of links of a chain (Figs. 11 and 13). Each pad 75 has a hollow spindle 76 projecting from each end thereof and offset from its longitudinal center toward the convex edge of the pad, being disposed in concentric relation to such edge. The pads are successively connected together at each end by angled links 77, each link pivotally connecting adjoining spindles 76 so that the several pads of each apron are connected together in continuous chain form. A roller 78 is mounted on each spindle 76 without the links 77 thereon for engagement with the sprockets wheels 63. The rollers 78 are held in position against the links 77 by spacing collars 78'. The spindles 76 of successive pads are connected together in pairs at their outer ends by return couplings 79, which provide communication between successive pads through the spindles thereof. The couplings 79 at one edge of the apron are disposed in staggered or alternating relation to the couplings at the other edge of the apron so that a cooling fluid will circulate backward and forward continuously through the successive pads from the inlet to the outlet points. The couplings 79 are secured to the spindle ends in any suitable manner to prevent leakage at the joints, as illustrated in Fig. 13. One or more couplings 79 of an apron has an inlet arm 79ª connected by a flexible connection 80 to a means (not shown) for forcing a cooling fluid through the apron, as for instance, to the city water line, and another coupling has an outlet arm 81 from which the fluid may discharge. A detail of one form of the connection 80 is shown in Fig. 5ª and illustrates it as having two flexible joints and a telescoped longitudinally extensible section between the points. It is evident that the fluid may flow through the apron either in one or opposite directions from the inlet 79ª to one or more outlets 81. The pads 75 are of shell form and permit the passage of quite a volume of cooling fluid therethrough so as to effect by radiation a rapid cooling of the glass sheet passing between the two aprons.

The aprons C are intended to cooperate to grip the sheet a therebetween at predetermined intervals by the provision of raised or outwardly projecting surfaces 82 on certain opposing pads 75 thereof, as shown in Fig. 11. The pairs of sheet gripping pads 75, 82 of the two aprons are preferably so arranged that one pair of pads moves into gripping engagement with the sheet near its formative point while the pair of pads which last engaged the sheet is actuated to release the sheet. In other words, the period of engagement of the sheet by one set of gripping pads is approximately simultaneous with the period of release of the next lower set of gripping pads from the sheet. This is important as it provides a continuous one-point supporting engagement for the sheet so that the sheet is free to stretch out below such point, thus preventing any tendency of the sheet to wrinkle by reason of its being supported at two separated points while in a soft or flowing condition. It will be understood that if a soft sheet of glass is engaged at two vertically spaced supporting points, the tendency of the glass, if sufficiently soft or fluid for such purpose, is to stretch or thin out downwardly from its upper point of engagement and to thicken toward its lower point of engagement, thereby not only providing a sheet section which is of tapered form in vertical section, but also occasioning wrinkles in the glass toward the lower end of the section. For this reason it is important to release one set of gripping pads from the sheet approximately simultaneous with the engaging of the next set of gripping pads with the sheet. The engagement of the gripping pads with the sheet tends to hold the sheet centrally in the space between the two aprons and out of contact with either, thus preventing any marring of the sheet surfaces by the aprons at points intermediate the gripping pads. It will be understood that the speed of driving of the aprons C is regulated to suit the speed at which it is desired to deliver the sheet $a$ from the source, the aprons thus serving as a feed controlling means and taking the weight of the sheet so as to relieve the soft glass at the discharge orifice from the gravity pulling action of such sheet, at least some extent, if the weight had too great a stretching or thinning action on the glass at its point of flow from the discharge orifice. In Fig. 27 one cooling apron is shown as removed and an open form of sheet engaging and feeding member substituted.

The gripping of the sheet at intervals by the gripping pads of the aprons tends to prevent the shrouding which might otherwise occur in the sheet by reason of the edge portions thereof cooling more rapidly than its central portion so that the central portion would be permitted to sag down with respect to the edge portions. This shrouding action might also occur if the sheet were gripped only at its edges by feed controlling or supporting means. The spacing of the sheet gripping pads is such, however, that there is little, if any, tendency of the sheet to sag or shroud intermediate the gripping points.

An important function of the sheet gripping pads is to provide the sheet at intervals with integral cross-bar or truss portions $c$, which, by the time the gripping pads forming the same have released the sheet, will have become sufficiently chilled by the cooling action of the pads as to become permanently set and thereby act as rigid cross-bars for preventing shrouding, sagging or narrowing in of the interposed soft portions of the sheet after passing from between the aprons C. It is preferable to form the integral cross-bars $c$ in the sheet by pressing engagement thereagainst of the gripping pads of the aprons, but such cross-bars may be formed in any other suitable manner, as for instance by directing a stream or blast of cooling fluid against the portion of the sheet surfaces intended to form the cross-bars. This may be accomplished by providing opposing pairs of pads 75 of the aprons with perforations 75$^a$ (Fig. 11$^a$) for directing a cooling fluid from the interior of the aprons against the sheet at the points where it is desired to form the integral hardened cross-bars. In this case the gripping bars could be eliminated. If it is desired to increase the strength of the truss sections $c$ the gripping portions of the pads may be corrugated or otherwise suitably formed to impart a corresponding form to the truss sections, as shown in Fig. 11$^b$.

The sheet $a$, after passing from between the aprons C, passes between opposed temperature regulating members D, which are free from contact with the sheet surfaces and have chambers 85 to permit the circulation of a temperature controlling fluid therethrough. The chambers 85 have fluid circulating pipes 96 leading to and from the same and provided with flexible connections 87 to permit inward and outward adjustment of the members. The members D are suspended from the respective frame-yokes 57 and 58 by respective arms 88 projecting downward and inward therefrom (Fig. 3).

The leer E into which the sheet $a$ passes after merging from between the temperature controlling members D has a movable section 90 (Figs. 15 and 18) disposed a short distance below the members D and having an opening 91 in its top through which the sheet $a$ passes into the leer. The leer section 90 is open at its ends and has a leer section 92 extending into or in substantially closed connection with its forward end and movable to permit vertical movements of the section 90. The remaining portion 93 of the leer is stationary, as shown in Fig. 23. Two rails 94, forming a track, are provided through the leer on the bottoms of its sections and a plurality of trucks F are mounted on the track in close end abutting position for movement through the leer. Each truck enters the leer section 90 through its rear end and has its body portion of open top box form and provided with a plurality of vertical partitions 95 dividing the truck longitudinally thereof into a plurality of equidistantly spaced narrow compartments 96, each adapted to receive a single section b of the glass sheet as the truck advances under the sheet. It will be understood that the sections b of the sheet are divided by the integral cross-bars c therein and that after a section has passed into a registering compartment 96 and is near the bottom thereof a cutting or breaking off means acts on the sheet at or adjacent to the cross-bar c at the upper end of such section and effects a severing of the section from the sheet. The trucks F, in the present instance, are mounted on free rolls 97 travelling on the rails 94 and loosely tied together by links 98. The rails 94 at the joints between the relatively movable leer sections are in lapped pin and slot connection, as shown in Figs. 24, 25 and 26.

The movable leer section 90 is suspended from the top portion on the top beams 13 of the frame G for horizontal movements longitudinally thereof and for raising and lowering movements therewith. The frame H comprises a pair of top beams or members 100 disposed at the outer sides of the beams 13 parallel therewith and having rollers 101 carried by and projecting inward therefrom and resting on the tops of the respective beams 13 for longitudinal movements thereon. The beams 100 are tied together at their front and rear ends by cross-bars 102, and a bar 103 is fixed to and rigidly suspended from the front and rear ends of each beam 100. The two rear and the two front bars 103 are connected in pairs at their lower ends by cross-bars 104 and 105 extending respectively over and under the adjacent ends of the leer section 90 to which they are attached, whereby such section is carried by the bars 103 for movements therewith. The bars 55 which carry the aprons C and temperature controlling members D are also suspended from the top beams 100 of the frame H. It is thus evident that the cooling aprons C, temperature controlling members D and leer section E are carried by the frame H as a unit for vertical movements with the frame G and for horizontal movements relative thereto.

The horizontal adjustment of the frame H is effected by a turning of a pair of screw shafts 106, one of which is journaled in a bracket 107 (Fig. 1) on the forward end of each beam 13 of the frame H. The end of each shaft 106 is threaded into a front end portion of the respective beam 100 whereby a turning of the shafts will impart horizontal movement to the frame H on the frame G. Each shaft 106 is in chain and sprocket wheel connection 108 with the subjacent screw shaft 47 so that a turning of said latter shafts by an operation of the ratchet arms 50 will impart simultaneous turning movements to the shafts 106. The sprocket wheel of the connection 107 which is located on the shaft 47, is one-half as large as the sprocket wheel on the shaft 106, so that upon an operation of the ratchet means the frame H will be moved inward or outward as the case may be at one-half the speed of movement of the forehearth section 21 to which the screws 47 are connected.

A bracket arm 110 is connected to each bar 103 of the frame H for vertical swinging adjustment relative thereto, and a separate shaft 111 is journaled in each forward and rear bar of these arms (Figs. 1, 3 and 8). Each shaft 111 has a crank or eccentric portion 112 near each end and connected by a respective link 113 to the adjacent end of each of the two outer shafts 56 of the set. A crank-arm 114 is mounted on each end of each shaft 111 to facilitate an operation of the same from either side of the apparatus. It is evident that, due to the parallelogram movement of the apron suspending means, a rocking of either shaft 111 will effect an inward or outward swinging of the connected aprons C without affecting the parallel relation of said aprons.

The automatic means employed in the present instance for severing or breaking the sheet a into sections, includes a stationary breaker bar 115, which is rigidly secured within the leer section 90 crosswise thereof and slightly above the trucks F, and a movable breaker bar 116, which extends across the leer section 90 and is movable toward and away from the bar 115 to coact therewith to break off an interposed sheet a along the chilled brittle cross-bar c thereof. The movable bar 116 projects at its ends without portions of the side opening of the leer section 90 and has arms 117 projecting therefrom longitudinally of the leer and provided with rack teeth on their inner sides (Figs. 18 and 20). These arms are fixedly carried by brackets 118 projecting from the side of the leer.

A vertical shaft 119 is mounted at each side of the leer section 90 in brackets 120 projecting therefrom and has a segmental pinion 121 meshing with the teeth of the adjacent rack arm 117, whereby rocking movements of the shaft will impart reciprocatory movements to the breaker bar 116. An arm 122 projects inward from the upper end of each shaft 119 and these arms are connected at their inner ends to one arm of a bell-crank lever 123 mounted on a stud projecting from the top of the lever section 90. A rod 124 connects the other end of the lever to one arm of a bell crank lever 125 pivoted to a stationary part 126 at a side of the leer. The other arm of the lever 125 is connected by a rod 127 to a plunger 128, which is mounted for reciprocatory movements in the case 65. A cam-gear 129 is mounted in the case 65 and driven by one of the pinions 66 at the desired speed. This cam-gear has a cam-groove 130 in one or both sides thereof in which a pin or roller on the plunger 128 travels, whereby a reciprocatory movement is imparted to the plunger at each predetermined length of movement of the sheet a.

The rocking of the shafts 119, in addition to operating the breaker-bar 116 is also utilized to impart step by step advancing movements to the trucks F. For this purpose each shaft 119 is provided at its lower end with a rocker member 140 having a socket 141 therein. A plunger 142 is mounted in the socket and has a stem projecting axially therefrom through one end wall of the socket and carrying a pawl 143 for engagement with successive ratchet teeth 144 on the adjacent lower edge portion of each truck F when the shaft 119 is rocked. A spring 145 acts on the plunger 142 to normally project the pawl into ratchet tooth engaging position. The outward swinging movements of the pawl are limited by a pin 146 on the pawl stem engaging the bottom wall of the socket. The ratchet teeth 144 are formed in bars which extend lengthwise of the lower edge portions of the truck bodies at each side thereof and substantially abut at their ends against the ratchet bars of adjoining trucks. It is evident that when the shafts 119 are rocked in one direction the pawls 143 will swing back over one or more ratchet teeth depending on the extent of swinging movement of the pawls, and that upon a forward rocking thereof the pawls will engage teeth in the ratchet bars and impart a predetermined forward feeding movement to the trucks. Each feeding movement of the trucks corresponds in length to the distance between the centers of adjoining compartments 96 of the trucks. The leer section 90 is engaged at its forward lower edge portion by one or more screws 147 to prevent a forward movement of the section with the trucks when advanced.

A manually operated sheet severing or breaking-off means is mounted on top of the leer section 90 and includes a pair of opposed rolls 150 between which the sheet passes and having a pair of opposed sheet engaging and breaking-off ribs 151 thereon. The rolls are journaled at their ends in respective brackets 152 rising from the leer section. The rolls are geared together to have opposite turning movements, and an operating crank 153 is provided at the end of one roll. This manually operable severing means is particularly useful when, as in first starting or adjusting the apparatus, portions of the sheet are imperfect, as it makes possible the removal of such portions without passing them through the leer.

In the manufacture of sheet glass by my method and apparatus the forehearth B is vertically adjusted with respect to the surface of the glass in the tank or furnace A to secure the desired head of flow of the glass through the trough portion of the forehearth to the discharge slot 27 thereof, the glass thence flowing downward by gravity through said slot in sheet form, the thickness of the sheet usually being determined by the width of the slot, the consistency of the glass and the glass head or pressure above the slot. The forehearth B is carried by the upper portion of the frame G, and its vertical adjustment is effected by a raising or lowering of said frame which in turn is accomplished by a running of the motor 10 to drive the several worm wheels 7 that support and are threaded on the lower ends of the frame uprights 4. The sheet after leaving the slot 27 passes down between the feed controlling and cooling aprons or blankets C and then passes down between the temperature regulating members D which either cool the glass or maintain it at the temperature at which it should have when entering the leer E. The aprons C completely cover both sides of the sheet from a point near the discharge slot to a desired distance down from the same, but are free from surface marring contact with the sheet except at the points of opposed gripping of the pairs of gripping bars of the aprons thereagainst. The gripping bars of each apron are preferably so spaced lengthwise of the aprons that immediately after one pair of cross-bars has engaged the sheet, the pair of cross-bars which previously engaged the sheet will release the same, thereby preventing the sheet, which is more or less soft during its passage between the aprons, from being gripped for any considerable period by more than one pair of gripping bars. This is important for if the aprons or feed controlling means were to remain in spaced gripping engagement with the sheet for any considerable period the portion of the sheet between the two gripping points would have a tendency, due to gravity, of thinning at its upper portion and thickening at its lower portion and to wrinkle and warp due to such action. By releasing one set of gripping bars from the sheet at approximately the time of engagement of the next succeeding set of gripping bars with the sheet the weight of the sheet exerts a slight stretching or pulling action on the sheet, thereby preventing the warping and wrinkling which might otherwise occur. The engagement of the sheet by the cross-bars entirely across the width of the sheet also prevents a narrowing of the sheet and a shrouding or sagging of the sheet between its edges, which frequently occurs by reason of the edge portions of the sheet cooling more rapidly than the intermediate portion. Another purpose of gripping the sheet at intervals throughout its width is to provide the sheet at the points of gripping with integral hardened cross-bar portions, the gripped portions of the sheet being quickly cooled by the cooling action of the bars. The sheet after passing from between the temperature regulators D enters the subjacent leer section 90 through the top opening 91 thereof, passes between the severing bars 115, 116 and then enters a registering compartment 96 of a truck F. When the hardened cross-bar $c$ at the upper end of the lower suspended sheet section $b$ has moved into register with the breaking-off bars the bar 116 is automatically moved toward the bar 115 to effect a breaking-off of the sheet along or adjacent to the cross-bar, thereby permitting the lower section $b$ to drop into the compartment into which it is being lowered. It is preferred to have each section severed off while still as hot as it can be without danger of deformation. This not only conserves heat, but also lessens the danger of cracks spreading from the breaking line and shattering the sheet. Immediately after the breaking-off action the pawls 143 are swung forward by a rocking of the shafts 119 and the trucks F are moved forward by the engagement of the pawls with the ratchet teeth 144 of the adjacent truck, the movement of the trucks being sufficient to place the next compartment 96 into register with the lower end of the next sheet section $b$ in order. The operation of the breaking-off bar 116 and the movement of the trucks is properly synchronized with the feeding or lowering movement of the sheet, so that the breaking-off occurs when each cross-bar $c$ of the sheet moves into register with the breaking-off members. During the breaking-off action the engagement of the sheet by the bar 116 slightly deflects the sheet from its natural course so that after the breaking-off action the lower advancing end of the next section $b$ will be caused to enter the next truck compartment 96 in order. If the forehearth B is vertically adjusted to control the flow of the glass from the furnace $a$, the leer section 90 into which the sheet sections first enter is vertically adjusted therewith so that the distance between the forehearth and leer may be maintained constant irrespective of the adjustment of the forehearth. If it is desired to adjust the width of the glass discharge slot 27 in the forehearth bottom, the ratchet lever 50 is operated to effect a turning of the screws 47 and also a turning of the screws 106 which latter are connected to the former by the chain and sprocket connection 107. The operation of the screws 47 imparts movements to the cradle 39, 40 which carries the front forehearth section 21 and travels on the side beams 18 of the frame G, thereby moving the forehearth section 21 and effecting a consequent narrowing or widening of the glass discharge slot 27. The screws 106 are connected to the horizontally movable frame H which is suspended from the top of the frame G, and a turning of said screws, which, in the present instance, is half as fast as the turning of the screws 47, imparts inward or outward adjusting movement to the frame H in the direction of adjustment of the forehearth section 21 and at one-half the speed of adjustment thereof. The cooling aprons C, temperature regulating members D and leer section 90 are carried by the frame H for adjustment therewith. It is evident that upon an adjustment of the width of the slot 27 the center line of the slot or the center line of a sheet flowing therefrom will be adjusted only one-half the amount of adjustment of the outer wall of the slot, which is formed by the inner bottom edge of the outer forehearth section 21. It is desirable in adjusting the width of the slot to move the frame H at only one-half the speed of adjustment of the forehearth section 21 so that the center line between the aprons will remain constant with the center line of the slot. The aprons C and regulating members D disposed at opposite sides of the sheet are suspended from the top of the frame G by the bars 55 and are operated to have relative inward and outward adjustment by a turning of the cranks 114, the crank shafts 111 of which are connected to the frames carrying the respective cooling members. The successive bars or link members 75 of each apron C are hollow and in communication therewith to permit a continuous circulation of a cooling fluid therethrough so that the cooling of the sheet as it passes down between the aprons is hastened by the radiant cooling action of the aprons, and the bars 75 which grip the sheet are likewise cooled to effect a more rapid chilling of the glass at the engaged points than at intermediate portions, to provide the sheet with successively spaced integral cross-bar portions which act to sustain the sheet and prevent sagging, shrouding and drawing in of the softer glass below or between the cross-bars.

It has been found in practice that in the practical rapid and efficient forming of sheet glass free from surface imperfections, shrouding and wave lines that impair the clear vision properties thereof, it is important (1) to deliver the molten glass rapidly in sheet form from a source of supply, and control the speed of flow or movement thereof so that the movement will not be accelerated by the weight of the glass sheet or column beyond the speed intended, and (2) to cool the sheet to a substantially set condition as rapidly as possible after forming with the cooling means spaced from the sheet so as not to mar the surfaces thereof and then to control the temperature of the sheet so that it will not lower below a predetermined temperature until it has entered the leer. If the speed controlling and cooling functions mentioned were performed by separate means it would be necessary to space the cooling means a sufficient distance from the sheet to permit the passage of the sheet gripping and speed controlling means down between the cooling means. This is impractical for rapid cooling as the cooling surfaces of the cooling means would be spaced too far from the sheet for rapid and efficient cooling. By combining the two features, however, the cooling surfaces are brought close to the sheet without contacting with the surface thereof, thereby effecting a rapid absorption of the heat from the sheet, and by projecting spaced portions of the cooling surfaces into opposed engagement with the sheet, the control of the sheet feed is accomplished. It will be understood that the speed of forming and travel of the sheet from the source by the natural flow of the glass depends largely on the consistency of the glass and that the speed of flow increases with the degree of fluidity of the glass. It is therefore evident that if the glass is leaving the supply source at a considerable speed it is important to cool the same as rapidly as possible after leaving the discharge slot to prevent stretching and thinning out of the sheet by reason of its weight, otherwise the sheet, unless substantially continuously gripped from the formative point to a point where it is set sufficient to prevent stretching, will stretch out or thin by gravity action between the points of gripping of the same by the speed control means, thereby permitting bad shrouding of the soft portions of the glass between the gripping points and a drawing in or narrowing of the sheet edges between such points.

I wish it understood that my invention is not limited to any specific construction, arrangement or form of the parts or to the use together or in combination of the different parts and mechanisms illustrated, but that it may be changed in various respects without departing from the spirit of the claims.

Having thus described my invention, what I claim as new, and desire to secure by Letters Patent, is,—

1. The method of making sheet glass, consisting in generating molten glass in sheet form from a source of supply and passing it between opposed surfaces, moving said surfaces parallel with the glass during a predetermined length of its movement, and maintaining said surfaces cool enough to effect a forced cooling of the glass.

2. The method of making sheet glass, consisting in generating molten glass in sheet form from a source of supply and passing it between opposed surfaces, moving said surfaces parallel with the sheet for a predetermined length of movement and in contact therewith at intervals spaced longitudinally of the sheet, and maintaining said surfaces cool enough to effect a forced cooling of the sheet therebetween.

3. The method of making sheet glass, consisting in flowing a sheet of molten glass by gravity from a supply source down between opposed surfaces, moving at least one of said surfaces parallel with the sheet for a predetermined length of movement and maintaining said surfaces continuous and cool enough to effect a forced chilling of the glass during said predetermined movement.

4. The method of making sheet glass, consisting in generating molten glass in sheet form from a source of supply and passing it between opposed surfaces, moving said surfaces with the glass during a predetermined length of movement, and maintaining the temperature of the surfaces below the temperature at which the glass hardens to effect a forced cooling of the glass.

5. The method of making sheet glass, consisting in generating molten glass in sheet form from a source of supply and passing it between opposed surfaces, moving said surfaces with the glass during a predetermined length of movement, and maintaining the surfaces at a temperature not materially exceeding that of boiling water.

6. The method of making sheet glass, consisting in generating molten glass in sheet form from a source of supply and passing it between opposed surfaces, moving said surfaces parallel with the sheet for a predetermined length of movement and in contact therewith at intervals spaced longitudinally of the sheet, and maintaining said surfaces at a temperature below that at which the glass hardens to effect a forced cooling of the sheet.

7. The method of making sheet glass, consisting in generating molten glass in sheet form from a source of supply and passing the formed sheet downward, chilling strips of glass at spaced intervals crosswise of the sheet below stretching temperature, sustaining the weight of the sheet by contact with said cross-bars successively during the time that each cross-bar constitutes the uppermost bar in the sheet and releasing each bar at substantially the instant when another bar is chilled above it and before the glass between the bars is hardened beyond the stretching stage.

8. The method of making sheet glass, consisting in generating molten glass in sheet form from a source of supply and passing it downward therefrom, hardening strips across the sheet at longitudinally spaced intervals to the cracking stage and cracking off successive lengths of the sheet at said bars while the glass between the bars is hot enough to prevent the spread of the cracks.

9. The method of making sheet glass, consisting in generating molten glass in sheet form from a source of supply and passing it downward therefrom, hardening longitudinally spaced strips of glass across the sheet to the cracking stage, sustaining the weight of the sheet by the uppermost of said chilled strips as each is formed, successively releasing each strip as the strip thereabove is formed and while the glass between the strips is still hot enough to stretch, and cracking off a length of the sheet through each successive bar while the glass adjacent to the bar is hot enough to prevent the spread of the crack.

10. The method of making sheet glass, consisting in generating molten glass in sheet form from a source of supply and passing it between opposed surfaces, moving said surfaces parallel with the sheet for a predetermined length of movement and in contact therewith at intervals spaced longitudinally of the sheet and maintaining said surfaces at a temperature not materially above that of boiling water.

11. In apparatus of the class described, a container for molten glass having an opening in its side below the glass level, a forehearth section comprising a bottom, sidewalls and an end wall, adapted to restrain glass flowing through said opening, and means for adjusting the forehearth section towards and from said opening to allow a sheet of lesser or greater thickness to flow downward past the bottom of said section.

12. In apparatus of the class described, a forehearth in communication with a source of molten glass supply and having inner and outer relatively adjustable sections forming at their adjacent edges a discharged slot for the glass, each section comprising a bottom and sidewalls, and means for relatively adjusting the sections to vary the width of the slot.

13. In apparatus of the class described, a forehearth in communication with a source of molten glass supply and having inner and outer relatively adjustable sections forming at their adjacent edges a discharge slot for the glass, means to simultaneously adjust said sections vertically, and means for relatively adjusting the sections horizontally to vary the width of the slot.

14. In an apparatus of the class described, a forehearth in communication at its inner end with a source of molten glass supply and having inner and outer body sections cooperating to form a glass discharge slot in the forehearth bottom, means carrying the forehearth for vertical adjustment to vary the speed of flow of the glass to the discharge slot and means for adjusting the outer section towards and from the inner section to vary the width of the slot.

15. In an apparatus of the class described, a molten glass supply furnace having a discharge opening in a side thereof, a forehearth in communication with said opening to permit glass to flow therein from the furnace, said forehearth having inner and outer body sections cooperating to form a bottom discharge slot for the glass, vertically adjustable supporting means carrying the forehearth, and means for adjusting the outer section horizontally upon the supporting means.

16. In a glass working apparatus, means forming a source of molten glass supply and having a side discharge opening, a vertically adjustable frame, a forehearth carried by the frame for adjustment therewith and having communication at its inner end with the discharge opening of the supply means, said forehearth having inner and outer body sections cooperating to form a bottom discharge opening for the glass, means forming a part of the frame and carrying the outer forehearth section for inward and outward adjustment relative to the inner section to vary the size of the discharge opening therebetween, and means to adjust the outer forehearth section.

17. In a glass working apparatus, means forming a source of molten glass supply and having a side discharge opening, a forehearth in communication at its inner end with the discharge opening and having inner and outer body sections cooperating to form a bottom glass discharge slot, a vertically adjustable frame carrying the inner forehearth section for vertical adjustment relative to the supply means discharge opening, and means carrying the outer forehearth section and horizontally adjustable on said frame to permit inward and outward adjustment of the outer section relative to the inner section to vary the size of the discharge slot formed thereby.

18. In a glass working apparatus, a forehearth having communication with a source of molten glass supply, a subjacent leer section, and means carrying the forehearth and leer section for vertical adjustment.

19. In a glass working apparatus, means for receiving molten glass from a source of supply and having a glass discharge opening, a leer section below said means, and means operable to impart vertical adjustment to both said first means and the leer section.

20. In a glass working apparatus, a vertically adjustable means for receiving molten glass forming a source of supply and from which the glass flows downward in predetermined cross-sectional form, a subjacent leer into which the glass passes after leaving said first means, and means connecting the leer and first means to cause them to have vertical adjustment together.

21. In a glass working apparatus, means from which a sheet of glass flows by gravity in predetermined form, a temperature controlling means through which the stream passes, a leer for receiving the stream after passing from the temperature controlling means, and means carrying said first two means and leer and operable to vertically adjust the same in unison.

22. In a glass working apparatus, a forehearth from which glass flows by gravity in predetermined stream form, temperature regulating means through which the glass passes after leaving the forehearth, a leer section for receiving the glass after leaving the temperature regulating means, and means carrying the forehearth, temperature regulating means, and leer section and operable to vertically adjust them.

23. In a glass working apparatus, means to hold a supply of molten glass from which a glass sheet is formed, and cooling blankets disposed at opposite sides of the sheet and moving therewith to effect a forced cooling of the sheet.

24. In a glass working apparatus, means for holding a supply of molten glass from which a sheet is formed, and endless cooling aprons disposed at opposite sides of the sheet adjacent to its formative point and moving a distance therewith at the speed of movement of the sheet to effect a forced cooling of the sheet.

25. In a glass working apparatus, means for holding a supply of molten glass from which a sheet is formed, and means effecting a forced cooling of the sheet movable with the sheet for a predetermined distance from a point adjacent to the formative point of the sheet and completely covering opposite sides of the sheet in spaced relation thereto, except at predetermined points of engagement of the means with the sheet.

26. In a glass working apparatus, means forming a source of glass supply from which a sheet of glass is generated, and cooling aprons covering predetermined portions of opposite sides of the sheet to effect a forced cooling thereof and continually moving therewith during a predetermined portion of its travel in spaced relation thereto and having chilled cross gripping bar engaging the sheet at longitudinally spaced intervals and controlling its speed of movement.

27. In a glass working apparatus, means forming a source of molten glass supply from which a sheet of glass is generated, and endless cooling aprons continually moving with the sheet at opposite sides thereof during a prolonged predetermined portion of its travel, said aprons having provision for the circulation of a cooling fluid therethrough to cool the surfaces thereof which move adjacent to the sheet.

28. In a glass working apparatus, means forming a source of molten glass supply from which a sheet of glass is continuously generated, and means including hollow endless flexible aprons disposed at opposite sides of the sheet and having predetermined lengths of movement in adjacent parallel relation to the sheet surfaces during a predetermined portion of the sheet travel, and means for circulating a cooling fluid through the aprons.

29. In a glass working apparatus, means forming a source of molten glass supply from which a sheet of glass is vertically generated, an endless flexible apron disposed at each side of the sheet and covering the respective side thereof for a predetermined portion of its length, the aprons having spaced successive points of engagement with the sheet and movable to control the speed of movement of the sheet from the forming source, said aprons also having provision for the circulation of a cooling fluid therethrough to effect a radiant cooling of the sheet passing therebetween.

30. In a glass working apparatus, means forming a source of molten glass supply from which a sheet of glass is generated and continuously moves, and water cooled means operable to successively chill the sheet at predetermined spaced intervals lengthwise thereof to provide the sheet with integral sustaining cross-bar portions.

31. In a glass working apparatus, means forming a source of molten glass supply from which a sheet of glass is generated, means for controlling the speed of movement of the sheet from the generating source and having successive pairs of opposed sheet gripping bars which move a distance with the sheet and then release the same, the bars having provision for the circulation of a cooling fluid therethrough whereby the sheet is chilled at the gripping points to provide it with integral hardened cross-bar portions.

32. In a glass working apparatus, means forming a source of molten glass supply from which a sheet of glass is generated, means for controlling the speed of movement of the sheet from the generating source and having successive pairs of opposed sheet gripping bars which move a distance with the sheet and then release the same, each set of bars releasing the sheet at approximately the period of engagement of the next set of bars therewith, the bars having provision for the circulation of a cooling fluid therethrough whereby the sheet is chilled at the gripping points to provide it with integral hardened cross-bar portions.

33. In an apparatus of the class described, means forming a source of molten glass supply from which a sheet of glass is generated and continuously moves, forced sheet cooling and speed controlling aprons mounted at opposite sides of the sheet and having predetermined lengths of travel therewith, and means carrying the aprons and operable to move the same inward and outward with respect to the sheet.

34. In a glass working apparatus, means forming a source of molten glass supply from which a sheet of glass is generated and continuously moves, and a pair of endless cooling aprons disposed at opposite sides of the sheet and guided to have predetermined portions of their movements lengthwise of the sheet in adjacent relation thereto, means for driving the aprons, and means for circulating a cooling fluid through the aprons during the travel thereof.

35. In an apparatus of the class described, a forehearth having communication with a source of molten glass supply and having inner and outer sections cooperating to form a glass discharge slot, a leer section subjacent to the forehearth, and means carrying the outer forehearth section and leer section and operable to impart predetermined simultaneous horizontal adjustment thereto relative to the inner forehearth section.

36. In an apparatus of the class described, a vertically adjustable frame, a molten glass supply, a furnace forehearth carried by said frame and having provision for the downward flow of glass in sheet form therefrom, a second frame carried by the first frame for horizontal adjustment relative thereto, and a leer section carried by the second frame below the forehearth for receiving the sheet.

37. In an apparatus of the class described, means forming a source of molten glass supply and having a discharge slot from which glass flows downward in sheet form and a part horizontally adjustable to vary the width of said slot, speed control means through which the sheet passes, means carrying the speed control means, and means operable to impart predetermined adjustment to the adjustable part of said first means and to move the speed control means to maintain its sheet receiving center in vertical alignment with the center of the discharge slot.

38. In an apparatus of the class described, a forehearth to which molten glass is supplied and from which it flows in sheet form, the forehearth having a sheet discharge slot and a section horizontally adjustable to vary the width of the slot, a sheet cooling and speed controlling means through which the sheet passes, a leer section below said means for receiving the sheet, means carrying the speed control and cooling means and the leer section for horizontal adjustment, and means operable to impart simultaneous horizontal adjustment to the forehearth section to vary the width of its discharge slot and to adjust the speed control and cooling means and the leer section to suit the slot adjustment.

39. In an apparatus of the class described, means forming a source of molten glass supply from which the glass flows downward in sheet form, and endless chains of blanket form guided for prolonged movement at opposite sides of the sheet in parallel relation thereto and having provision for the continuous circulation of a cooling fluid therethrough to effect a cooling of the interposed sheet by radiation.

40. In an apparatus of the class described, an endless sheet cooling apron mounted to have a portion of its length of movement in parallel cooling relation to a forming sheet, said apron having successive closely disposed hollow cross-bars linked together to present a substantially continuous outer surface, means connecting the interior of successive cross-bars at their ends whereby a continuous circulation of fluid from one bar to another may be effected therethrough, means for introducing a fluid into one or more cross-bars, and means forming a fluid outlet from a cross-bar of the apron.

41. In a glass working apparatus, means to hold a supply of molten glass from which a sheet is formed, a cooling blanket disposed at one side of the sheet, means for moving the blanket parallel with the sheet, and means to keep the temperature of the blanket from materially exceeding that of boiling water.

42. In a glass working apparatus, means to hold a supply of molten glass from which a sheet is formed, a cooling apron disposed at one side of the sheet for movement therewith, means to keep the temperature of the apron from materially exceeding that of boiling water, and means at the opposite side of the sheet to the apron cooperating therewith to grip the sheet at intervals and to control the speed of movement thereof.

43. In a glass working apparatus, means to hold a supply of glass from which a sheet is formed, a frame member mounted at each side of the sheet, means supporting the frame member at one side edge thereof only, apron guiding means carried by said members, and sheet cooling and speed controlling aprons mounted on said guiding means at opposite sides of the sheet.

44. In a glass working apparatus, means to hold a supply of glass from which a sheet is formed, a frame member mounted at each side of the sheet, means supporting the frame member at one side edge thereof only, apron guiding means carried by said members and sheet cooling and speed controlling aprons mounted on said guiding means at opposite sides of the sheet, and means connecting the aprons at the free edges of the frame members to supply a cooling fluid thereto.

45. In a glass working apparatus, means to hold a supply of glass from which a sheet is formed, frames mounted at opposite sides of the sheet for adjusting movements transversely thereof and having apron guiding parts disposed adjacent to the sheet at opposite sides thereof and parallel thereto, said parts being supported at one edge only, apron guiding and driving means carried by each of said frame parts, an endless cooling apron mounted on each guiding means for movement with the sheet and adapted for the circulation of a cooling fluid therethrough, and means connecting the aprons at the free edge of the frame parts for movement with the apron to supply a cooling fluid thereto.

In testimony whereof I have hereunto subscribed my name to this specification.

WILLIAM EMIL BOCK.